March 15, 1960 — L. H. KNIBB — 2,928,660
ICE CREAM FREEZERS
Filed May 7, 1957
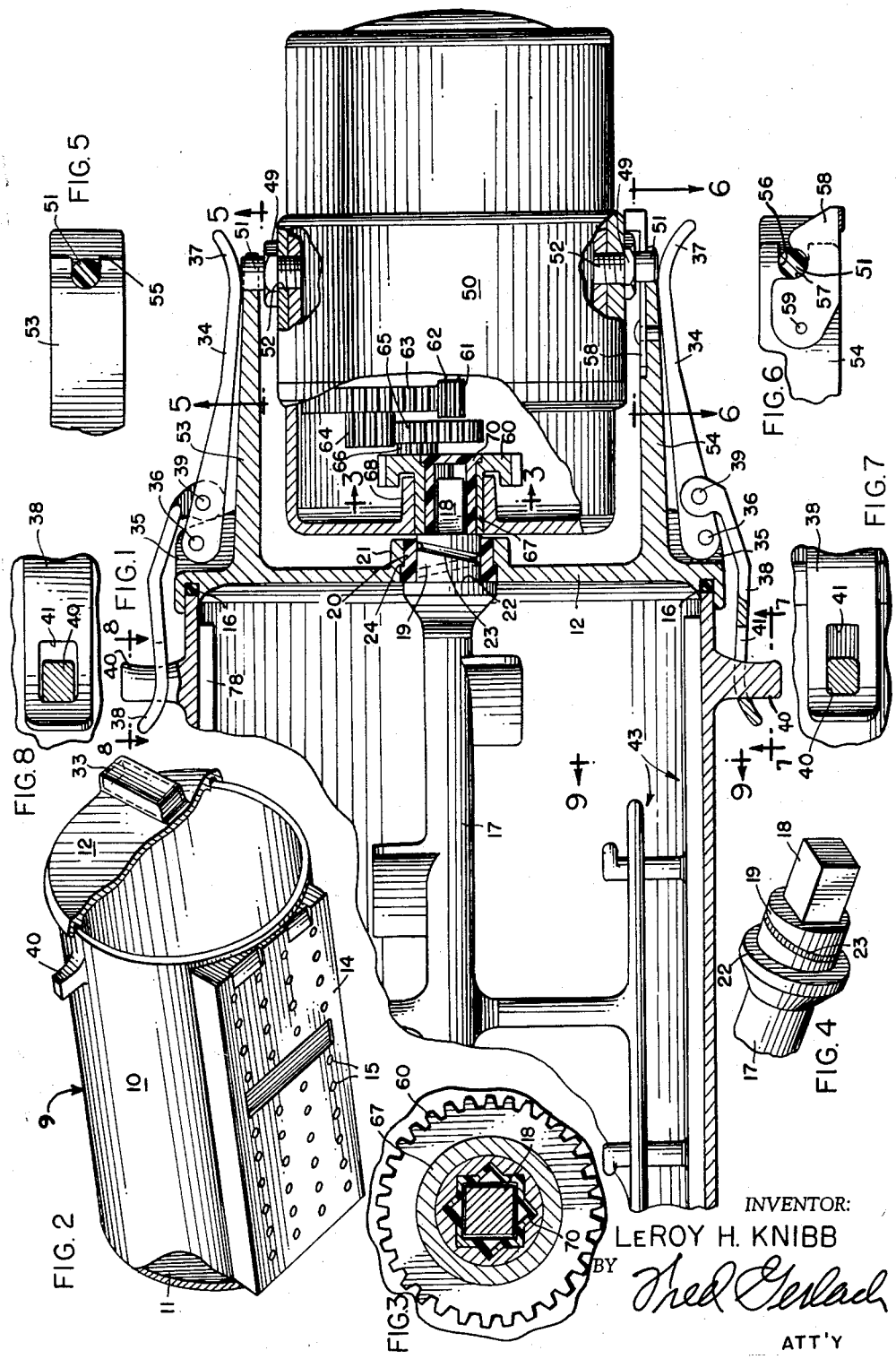
INVENTOR:
LeROY H. KNIBB
BY Fred Gerlach
ATT'Y

United States Patent Office 2,928,660
Patented Mar. 15, 1960

2,928,660

ICE CREAM FREEZERS

Leroy H. Knibb, Chicago, Ill.

Application May 7, 1957, Serial No. 657,642

3 Claims. (Cl. 259—121)

This invention relates to ice cream freezers of the type which is adapted to be placed in a domestic refrigerator and includes a motor-operated dasher.

The objects of the invention are to provide a freezer of this type; which is adapted to prevent the conduction of heat generated by the motor to the container for the material to be frozen and the dasher; which permits movement of the motor mounted on the cover relatively to the dasher-shaft during the freezing of the ice cream; which facilitates the separation of the cover from the container when the cream has been frozen; and other objects which will appear from the detailed description.

The invention consists in the several novel features hereinafter described and more particularly defined by claims at the conclusion hereof.

In the drawings:

Fig. 1 is a fragmentary side elevational view, partly in section of an ice cream freezer constructed in accordance with the principles of the present invention;

Fig. 2 is a bottom perspective view of the container portion of the freezer;

Fig. 3 is a sectional view taken substantially along the line 3—3 of Fig. 1;

Fig. 4 is a perspective view of one end of a dasher shaft employed in connection with the invention;

Fig. 5 is a sectional view taken substantially along the line 5—5 of Fig. 1;

Fig. 6 is a sectional view taken substantially along the line 6—6 of Fig. 1;

Fig. 7 is a sectional view taken substantially along the line 7—7 of Fig. 1; and Fig. 8 is a sectional view taken substantially along the line 8—8 of Fig. 1.

Referring now to the drawings, the freezer of the present invention includes a container 9, for the cream or other material to be frozen. The container 9 is adapted to be disposed in the freezing compartment of a domestic refrigerator. The container comprises a cylindrical body 10 having an integral wall at one end and an open opposite end adapted to be closed by a cover which is generally designated 12. The container 10 has an integral flat longitudinal base 14 which is adapted to rest on a shelf or support for supporting the container horizontally in the refrigerator. The under face of base 14 is flat and provided with circular recesses 15 of sufficient area to individually retain separated drops of water which will freeze rapidly when the container is in the refrigerator, to expedite the chilling of the contents of the container, and also to assist in holding the freezer in place. In practice, it has been found that the separate drops of water freeze almost instantly and expedite the chilling of the material in the container, as well as assisting in holding the freezer in place.

An electric motor housing 50 is demountably supported on the cover 12 and is provided with a pair of trunnions 51 which are threadedly received as at 52 in the annular wall of the housing. Lock nuts 49 secure the trunnions in any desired position on the housing wall. The cover 12 is provided with a pair of oppositely disposed longitudinally extending posts 53 and 54 between which the motor housing 50 is supported. The posts 53 and 54 straddle the housing 50 and the distal ends thereof are adapted to engage the trunnions 51 when the motor housing is assembled on the container. The post 53 is provided with a straight-sided slot 55 and the post 54 is provided with an undercut slot 56. When the trunnions are placed within the slots 55 and 56, the undercut portion of the slot 56 will retain by gravity the trunnions seated therein. When the motor is in operation, the rotative torque on the motor casing 50 will urge the trunnion 51 in the slot 56 into interfitting relation with the undercut portion of the slot for holding the motor casing against endwise separation from the cover. A latch 58 pivoted at 59 on the post 54 is provided for holding the motor casing 50 in connected relation to the posts when the motor is idle. The trunnions 51 and nuts 49 are preferably formed of nylon to minimize head-conduction from the motor casing to the posts 53 and 54 and cover 12.

The cover is detachably locked on the container for loading the material to be whipped and frozen into the container and removing it therefrom, by a diametrically opposite pair of locking devices, each of which comprises: a lever 34 connected by a pivot-pin 36 to an ear 35 which is integral with the cover 12, extends outwardly from said pin and terminates in an outwardly curved handle 37; a link 38 connected by a pivot-pin 39 to lever 34; and a stud 40 integral with the body of the container 12 and adapted to extend through a slot 41 adjacent the distal end of a link 38. The levers 34 and links 38 are pivoted to swing in the plane of posts 54. In locking the cover, the levers 34 swing toward the posts 53 and 54 so that they can be conjointly and readily gripped to force the levers across their dead-center relation with links 38. In coupling the container and cover, the levers 34 are swung into position so that the slots 41 in the distal ends of links 38 can be hooked on studs 40, and the cover seated on the container. Levers 34 are then swung toward each other and into engagement with the posts 53 and 54, whereupon the levers 34 and links 38 will snap into position against the posts 53 and 54 by a toggle action as shown in Fig. 1. For releasing the cover, which usually becomes solidly frozen to the container during a freezing operation, the levers 34 are swung apart and away from posts 54. Initially the levers and links move independently of studs 40 until the outer ends of slots 41 in the links abut against the outer ends of said studs. Then further swinging movement of the levers will cause the links to exert in a downward thrust against the inner ends of studs 40 and positively force the cover away from the container and break any ice between them. The devices are thus adapted to expeditiously lock the cover on and release it from the container. The cover is provided with an annular gasket 16 which seats on the rim of the container and forms a seal between the cover and the container.

The cover 12 is provided with a vent 33 in the upper regions thereof to permit escape of air during expansion of the material in the container during its agitation and freezing and the cover can be secured on the container only in one relative position between the posts 53 and 54 inasmuch as one of the studs 40 and its coacting slot 41 is narrower than the other stud and its coacting slot.

An agitator shaft 17 is rotatable in the container, separable from the cover, and provided with a dasher assembly 43 of any suitable type, as well understood in the art. The inner end (not shown) of said shaft extends to the inner end wall of the container. The outer end of shaft has an integral cross-sectionally polygonal terminal or stem 18 at the outer end of a cylindrical journal 19. Said journal fits the inner periphery of a bushing 20 which is formed of nylon and is confined in a boss 21 on the cover 12. Journal 19 is disposed outwardly of an annular shoulder 22 on and integral with shaft 17. A helical groove 23 in the periphery of journal 19 has a pitch-angle and direction so that during the rotation of shaft 17, said groove tends to move any material from the journal towards the container. The bushing 20 has an annular integral shoulder 24 which is secured in boss 21 and being formed of nylon minimizes conduction of heat generated by the motor to the cover 12 and shaft 17.

The stem 18 of the shaft 17 is loosely coupled to a gear 60 which has a hub 67 journalled in a boss 68 which is integral with the cover 12. The hub 67 is provided with a socket of polygonal cross-section to loosely receive the correspondingly polygonal stem 18. A cup-shaped nylon liner 70 fits over the polygonal stem 18 for minimizing heat conduction from the motor to the shaft 17.

Gear 60 is driven from the motor-shaft 62 through speed-reducing gearing which comprises a pinion 61 on shaft 52 and intermediate gears 63, 64, 65 and 66 in the motor housing 50.

In practice the product in the container after it becomes frozen sometimes stresses the shaft 17 out of its true axial relation in the container. The endwise and pivotal movement of the motor and its housing permits the motor and its housing to follow the stem 18 when shaft 17 is stressed into different axial positions and avoid binding of the motor in its supports. Another characteristic of the construction described is that trunnions 51 with their lock-nuts 53, bushing 20, liner 70, are all formed of nylon which has a very low coefficient of heat conduction, and substantially prevent any heat from the motor and its housing from being transmitted to the dasher-shaft and container.

Another characteristic is that the locking-devices for the cover include levers which swing in the plane of posts which demountably support the motor and when locked are disposed alongside of said posts. These devices are also adapted to release the cover when it becomes frozen onto the container.

Another characteristic is that these locking devices are constructed to prevent the cover from being placed out of its correct relation to the container.

The invention is not to be understood as restricted to the details set forth since these may be modified within the scope of the appended claims without departing from the spirit and scope of the invention.

Having thus described the invention, what I claim as new and desire to secure by Letters Patent is:

1. In a freezer for use in a refrigerator the combination with a cylindrical container adapted to assume a horizontal position in the freezing compartment of a refrigerator and having an open end; a removable cover for said open end, means providing a vent in the upper regions of said cover when said container is in its horizontal location, a shaft with a dasher rotatable in the container, posts on the cover, and an electric motor for driving the shaft demountably supported between the posts, of means for locking the cover on and forcibly releasing it from the container, including a pair of diametrically opposite levers pivoted on the cover to swing in the plane of said posts, diametrically opposite studs on the container, toggle links pivoted to and to swing in the plane of the levers, having their distal ends provided with slots to receive the studs, and of limited range, one of the ends of which is engageable with one of the ends of the studs when the levers are swung to lock the cover on the container and the opposite ends of which are engageable with the other ends of the studs, for forcing the cover apart from the container when the levers are reversely operated, the studs and slots in the links being of different width to prevent placement of the cover in any but a single rotative position relatively to the container wherein the vent in the upper regions of said cover assumes an elevated position adjacent the top of the container.

2. A freezer for use in a refrigerator comprising: a receptacle having an open end; a removable cover for closing said open end, a dasher-shaft coaxial with and in the receptacle, an electric motor detachable from the cover, embodying a housing, and having its axis generally coincident with the axis of the shaft in the receptacle, a detachable driving connection between the motor and said shaft, posts on the cover, extended along and spaced outwardly from the side of the motor housing and provided with open ended slots, and trunnions on and projecting transversely and outwardly from the sides of said housing and insertable transversely into and movable out of said slots by relative transverse movement of the motor and the cover, for detachably supporting the motor between the posts on the cover, the trunnions being axially and pivotally movable in the posts to permit movement of the motor relatively to the shaft.

3. A freezer for use in a refrigerator comprising: a receptacle having an open end; a removable cover for closing said open end; a dasher-shaft coaxial with and in the receptacle; a dasher on said shaft detachable from the cover; an electric motor embodying a housing and having its axis generally coincident with the axis of the shaft in the receptacle; a motor-driven gear journalled on the cover; a detachable connection between said gear and said shaft; posts on the cover, extended along and spaced outwardly from the side of the motor housing and provided with open ended slots; and trunnions on and projecting transversely and outwardly from the sides of said motor housing and insertable transversely into and movable out of said slots by relative transverse movement of the motor and the cover, for detachably supporting the motor between the posts on the cover, the trunnions being axially and pivotally movable in the posts to permit movement between the gear relatively to the shaft.

References Cited in the file of this patent
UNITED STATES PATENTS

| 1,484,525 | Noeggerath | Feb. 19, 1924 |
| 2,599,021 | Bastian | June 3, 1952 |
| 2,817,502 | Yohe | Dec. 24, 1957 |